United States Patent
Yu et al.

(10) Patent No.: US 11,437,914 B2
(45) Date of Patent: Sep. 6, 2022

(54) PROVIDING A WIDE VARIETY OF VOLTAGES WITH A POWER SUPPLY THAT USES AN LLC TOPOLOGY

(71) Applicant: Dell Products L. P., Round Rock, TX (US)

(72) Inventors: Wei-Cheng Yu, New Taipei (TW); Merle Jackson Wood, III, Round Rock, TX (US); Tsung-Cheng Liao, Taoyuan (TW); Geroncio Ong Tan, Austin, TX (US); James C C Wu, Taipei (TW); Wen-Yung Chang, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 16/789,054

(22) Filed: Feb. 12, 2020

(65) Prior Publication Data
US 2021/0249961 A1 Aug. 12, 2021

(51) Int. Cl.
*H02M 3/335* (2006.01)
*G06F 1/32* (2019.01)
*H02M 1/42* (2007.01)
*H02M 1/00* (2006.01)

(52) U.S. Cl.
CPC .......... *H02M 3/33576* (2013.01); *G06F 1/32* (2013.01); *H02M 1/4208* (2013.01); *H02M 1/007* (2021.05)

(58) Field of Classification Search
CPC ........... H02M 3/33576; H02M 1/0019; H02M 3/1582; H02M 3/33571; H02M 1/007; H02M 1/4208; H02M 1/4291; H02M 1/4225; H02M 3/01; G06F 1/32
See application file for complete search history.

(56) References Cited

U.S. PATENT DOCUMENTS

| | | | |
|---|---|---|---|
| 2012/0293000 A1* | 11/2012 | Fan | H02J 1/102 307/64 |
| 2013/0043846 A1* | 2/2013 | Murdock | H02M 1/4225 323/205 |
| 2014/0160805 A1* | 6/2014 | Oh | H02M 1/4241 363/21.02 |
| 2017/0070150 A1* | 3/2017 | Kim | H02M 3/33507 |
| 2017/0104417 A1 | 4/2017 | Hung et al. | |
| 2018/0321734 A1 | 11/2018 | Wu et al. | |
| 2019/0149761 A1* | 5/2019 | Cai | H02M 1/4208 348/730 |
| 2021/0008312 A1* | 1/2021 | Young | A61M 16/021 |

* cited by examiner

*Primary Examiner* — Jared Fureman
*Assistant Examiner* — Esayas G Yeshaw
(74) *Attorney, Agent, or Firm* — Larson Newman, LLP (57) ABSTRACT

As an example, a power supply may provide a particular voltage of multiple voltages based on a power profile provided by a universal serial bus Type C (USB-C) integrated circuit (IC) built-in to a USB-C port of a computing device. A power factor correction (PFC) converter may provide an output voltage that varies according to the power profile. The output voltage of the PFC converter may be used as an input to an inductor-inductor-capacitor (LLC) converter. The LLC converter may produce an output voltage that varies in voltage level proportionally to the PFC converter output voltage. The PFC converter may provide a voltage to the LLC converter that causes the LLC converter to provide an amount of voltage indicated in the power profile sent by the USB-C IC of the computing device.

17 Claims, 4 Drawing Sheets

PROVIDING A WIDE VARIETY OF VOLTAGES WITH A POWER SUPPLY THAT USES AN LLC TOPOLOGY

BACKGROUND OF THE INVENTION

Field of the Invention

This invention relates generally to power supplies and more particularly a power supply that can supply a wide variety of voltages using an LLC Topology.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A manufacturer of electronic devices, such as computing devices, may produce a variety of devices, including tablets, Chromebooks, laptops, 2-in-1s (e.g., a tablet that can be coupled to a keyboard to create a laptop), workstations (e.g., Dell® Precision®), and desktop computers. Two or more of the devices may use differing voltage power supplies. For example, tablets may use a 5-volt power supply, Chromebooks may use a 12-volt power supply, laptops may use a 15-volt power supply, and workstations may use a 20-volt power supply. Thus, the manufacturer may have to design, manufacture, and stock multiple power supplies for the variety of devices that the manufacturer sells. The manufacturer may also desire to provide power supplies that are efficient in terms of converting alternating current (AC) to direct current (DC) to reduce power consumption.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a power supply may provide a particular voltage of multiple voltages based on a power profile provided by a universal serial bus Type C (USB-C) integrated circuit (IC) built-in to a USB-C port of a computing device. A power factor correction (PFC) converter may provide an output voltage that varies based on the power profile. The output voltage of the PFC converter may be used as an input to an inductor-inductor-capacitor (LLC) converter. The LLC converter may produce an output voltage that varies in voltage level proportionally to the PFC converter output voltage. The PFC converter may provide a voltage to the LLC converter that causes the LLC converter to provide an amount of voltage indicated in the power profile sent by the USB-C IC of the computing device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein describe a power supply that uses an inductor-inductor-capacitor (LLC) topology to provide a variety of voltages, including 5-volts, 12-volts, 15-volts, and 20-volts (V) to an IHS (e.g., a computing device). Of course, these are merely given as examples of the types of voltages that can be provided as the system and techniques can be used to provide other voltages in addition to the example voltages. Many devices, such as computing devices, may receive power via a universal serial bus Type C (USB-C) port built-in to each device. A USB-C integrated circuit (IC) (e.g., a USB-C port controller) in the device may negotiate with (e.g., instruct) a power supply to provide a particular voltage (e.g., 5V, 12V, 15V, 20V, or the like). Such negotiations are referred to as USB-C power delivery (PD). For example, the USB-C IC may detect when a power supply has been connected to the USB-C port of the device. In response, the USB-C IC may request, using the USB-C protocol, that the power supply provide a particular voltage used by the device.

A resonant LLC topology converter allows for higher switching frequencies at higher efficiency power conversion as compared to conventional, e.g., hard switched, power converter topologies. The LLC topology is well suited for high power applications such as AC adapters (e.g., power supplies) rated at 90 watts (W), 130 W, 180 W, 240 W, 330 W and greater to meet Department of Energy (DOE) efficiency regulations. The LLC topology has two main differences as compared to conventional (e.g., hard switched) topologies. First, the LLC topology uses a narrow input voltage range to maintain a resonant mode. Second, the LLC topology is designed to provide a single output voltage. While it is possible to provide additional voltages using DC-to-DC converters to adjust the voltage output of the LLC topology converter, the use of additional DC-to-DC converters reduces the efficiency of the power supply (e.g., the power supply may not comply with DOE regulations), and adds to the overall product cost and complexity. Thus, a conventional LLC topology converter cannot by itself efficiently provide multiple output voltages for use with, for example, devices with USB-C ports. The systems and techniques described herein use a modified LLC topology to efficiently provide multiple output voltages, thereby enabling the power supply to be used to supply power to devices with a USB-C port.

The systems and techniques described herein use Active Power Factor Correction (PFC) to generate a high voltage output which is used as input to a downstream LLC topology converter (hereinafter LLC converter). The systems and techniques use a variable high voltage input to the LLC converter to enable the power supply to efficiently provide multiple voltages. The LLC converter is designed for a fixed output voltage, such that the fixed output voltage scales in voltage proportional to the PFC converter output voltage. Thus, by varying the PFC converter output voltage, the output voltage of the LLC converter can be varied, enabling the power supply to provide voltages ranging from 5V to 20V. The AC Adapter output voltage (e.g., LLC converter output) is adjusted based on the USB-C port controller adjusting the PFC output voltage as part of USB-C power delivery (PD). Adjusting the PFC converter output allows the LLC converter to provide the desired output voltage. The PFC converter may be referred to as a first stage and the LLC converter may be referred to as a second stage as the voltage output Vo of the PFC converter is provided as an input to the LLC converter.

The AC mains (e.g., typically 110V in North America and 220V elsewhere) are input to the PFC converter, and the output of the PFC converter is input to the LLC converter. The PFC output voltage control circuit is electrically connected to the LLC converter via the USB-C IC, and a switch module is electrically connected to the LLC converter and the PFC converter. The power adapter (e.g., power supply) may receive from the USB-C IC, during USB-C PD, an indication (e.g., instruction) to provide a particular output voltage. Based on the requested output voltage received by the power adapter, a switch module adjusts the switching frequency of the LLC converter to output the requested voltage. Thus, the systems and techniques described herein use the LLC topology converter along with varying the PFC output voltage to provide one of multiple different output voltages (e.g., 5V, 12V, 15V, and 20V) to enable the power supply to be used with devices that support USB-C PD. By doing so, DC-to-DC converters (e.g., post regulation) to provide one of multiple voltages are avoided, enabling the power supply to retain the high efficiency of an LLC converter. In addition, a single power supply can be provided with each device from the manufacturer that uses USB-C for power delivery, regardless of whether the device is a smartwatch, smartphone, tablet, 2-in-1, laptop, Chromebook, desktop, workstation, or the like, thereby reducing (e.g., simplifying) the manufacturer's design, manufacturing, and inventory of power supplies.

As an example, a power supply may include a PFC converter (e.g., first stage) and an LLC converter (e.g., second stage). The PFC converter may include a PFC controller and a PFC module. The LLC converter may include an LLC controller and an LLC module. The PFC converter is configured to receive, from a computing device that is connected to the power supply, a power profile associated with the computing device, and output a first particular voltage based at least in part on the power profile. A universal serial bus type-C (USB-C) cable connects the power supply to the computing device and a jack of the USB-C cable is plugged into a USB-C port of the computing device. The LLC converter is configured to receive the first particular voltage from the PFC converter and output, based on the first particular voltage, a second particular voltage to the computing device. For example, the second particular voltage may be specified in the power profile. The power profile is sent by a USB-C power delivery (PD) integrated circuit (IC) that is built-in to a USB-C port of the computing device. The USB PD IC sends the power profile in response to the USB-C PD IC determining that the USB-C cable is plugged into the USB-C port of the computing device. The USB-C PD IC uses dual optocouplers comprising a first optocoupler and a second optocoupler to indicate an amount of voltage to be provided by the power supply to the computing device. For example, when the first optocoupler is off and the second optocoupler is off the second particular voltage comprises 5 volts, when the first optocoupler is off and the second optocoupler is on the second particular voltage comprises 9 volts, when the first optocoupler is on and the second optocoupler is off the second particular voltage comprises 15 volts, and when the first optocoupler is on and the second optocoupler is on the second particular voltage comprises 20 volts. In some cases, a filter is used to remove ripple and noise from the second particular voltage to create a filtered voltage that is output to the USB-C port of the computing device.

Figure 1:
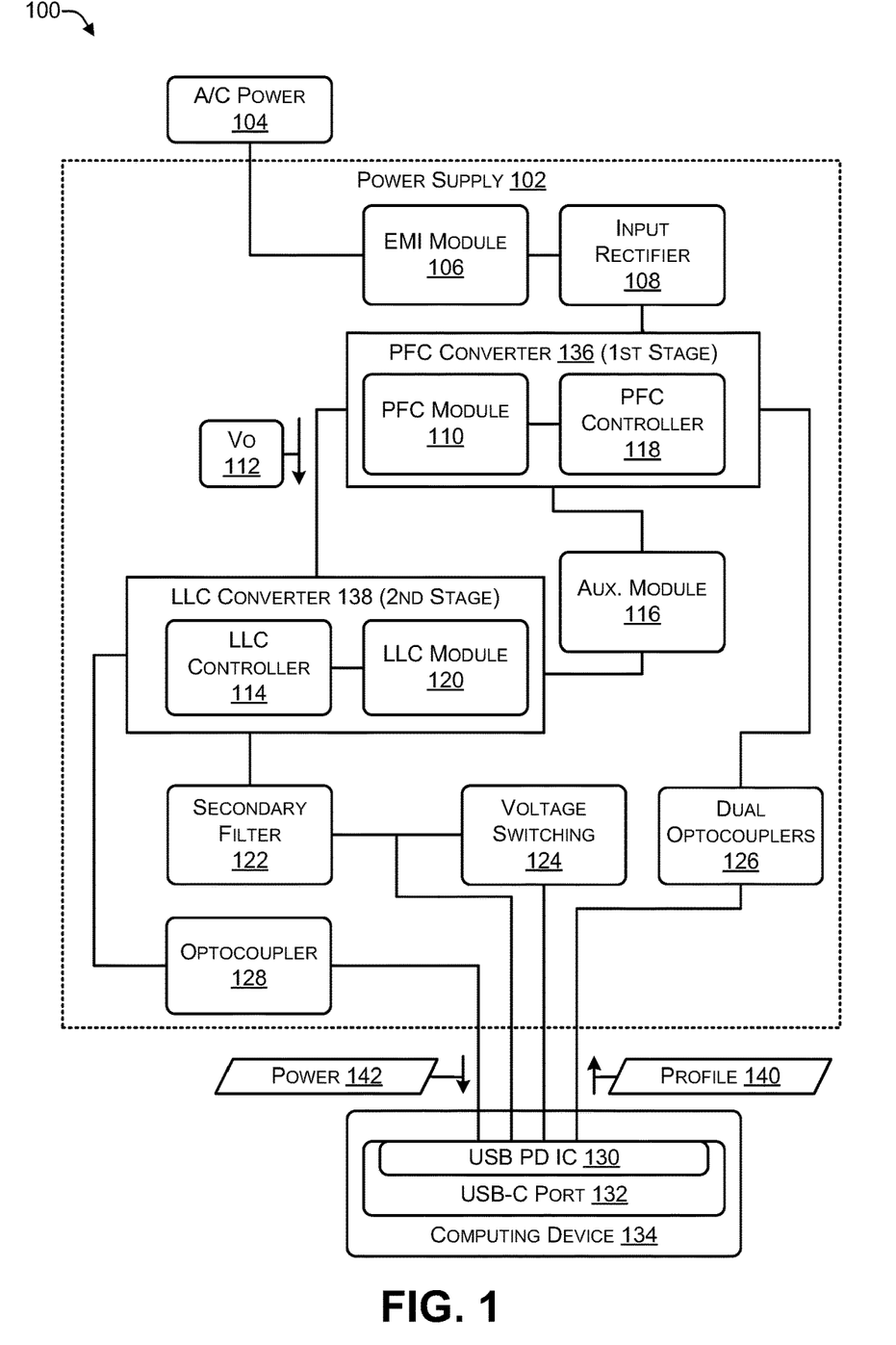
FIG. 1 is a block diagram of a system that includes a power supply capable of negotiating power delivery to a computing device, according to some embodiments.

FIG. 1 is a block diagram of a system 100 that includes a power supply capable of negotiating power delivery to a computing device, according to some embodiments. The system 100 includes a power supply 102 connected to a universal serial bus (USB) power delivery (PD) integrated circuit (IC) 130 of a USB type C (USB-C) port 132 of a computing device 134. For example, the computing device 134 may be a smartwatch, a smartphone, a tablet, a laptop, a Chromebook, a desktop, or another type of computing device. The computing device 134 may receive power via the USB-C port 132 built-in to the computing device 134. The USB PD IC 130 may control the PD function of the USB-C port 132 of the computing device 132.

The power supply 102, may receive alternating current (A/C) power 104 (e.g., 110V, 220V or the like) from an electrical outlet (also known as a mains) that is connected to a power grid. An electro-magnetic interference module (EMI) module 106 may be used to remove interference in the A/C that is generated, by an external source, using electromagnetic induction, electrostatic coupling, or conduction. The EMI module 106 may be used to remove EMI from the A/C power 104 and prevent the EMI from degrading the performance of the power supply 102. The output of the EMI module 106 (e.g., after filtering the A/C power 104) may be provided to an input rectifier 110 to rectify the A/C into direct current (DC) voltage.

The DC voltage output of the input rectifier 108 may be provided to a power factor correction (PFC) converter 136 that includes a PFC module 110 and a PFC controller 118. The PFC module 110 may increase the power factor of a load, thereby improving an efficiency of the power supply 102. For example, the input rectifier 108 may provide a non-linear load, distorting the current drawn. The PFC module 110 may be used to counteract (e.g., correct) the distortion created by the input rectifier 108 to raise the power factor. The PFC module 110 may output a variable voltage Vo 112. The PFC module 110 may implement a buck (e.g., step-down) converter and/or a boost (step-up) converter. The variable voltage Vo 112 output of the PFC module 110 may be controlled by the PFC controller 118. The PFC module 110 and the PFC controller 118 may collectively be referred to as the PFC converter 136. An auxiliary module 116 may provide voltage to power the PFC converter 136 and to an LLC converter 138.

The LLC converter 138 may include an LLC controller 114 and an LLC module 120. The LLC module 120 may implement a resonant LLC (e.g., inductor-inductor-capacitor) topology converter. The LLC converter 138 may receive as input the voltage output Vo of the PFC converter 136. The LLC module 120 may be controlled by the LLC controller 114. The LLC controller 114 and the LLC module 120 may collectively be referred to as an LLC converter 138.

A secondary filter 122 may be used to filter an output of the LLC module 120 to reduce ripple and noise in the power output by the LLC converter 138. Voltage switching 124 is used to switch electricity on or off to the computing device 134. When voltage switching 124 is turned on, the requested power 142 is provided to the computing device 134 by the power supply 102. When voltage switching 124 is turned off, no voltage is output to the computing device 134 from the power supply 102. Optocoupler 128 is part of a feedback loop between the PFC converter 136 and the LLC converter 138 that is used to control their respective output voltages. Unlike a conventional LLC converter in which the output of the PFC converter is a fixed voltage (e.g., typically 380 Vdc), the output voltage Vo 112 of the PFC converter 136 may be varied by the USB PD IC 130 using dual optocouplers 126.

The USB PD IC 130 in the USB-C port 132 of the computing device 134 may request a particular USB-C power profile 140 of multiple USB-C power profiles, e.g., as illustrated in Table 1. The USB PD IC 130 may use dual optocouplers 126 to indicate the requested voltage of the profile 140.

TABLE 1

| Power Profile | Voltage @ Amps | Wattage | Usage |
| --- | --- | --- | --- |
| Profile 1 | 5 V @ 2 A | 10 W | Handheld devices, peripherals |
| Profile 2 | 5 V @ 2 A<br>12 V @ 1.5 A | 18 W | Tablets, notebooks, peripherals |
| Profile 3 | 5 V @ 2 A<br>12 V @ 3 A | 36 W | Thinner/smaller notebooks, larger peripherals |
| Profile 4 | 5 V @ 2 A<br>12 V, 20 V @ 3 A | 60 W | Larger notebooks, hubs, docks |
| Profile 5 | 5 V @ 2 A<br>12 V, 20 V @ 5 A | 100 W | Workstations, hubs, docks |

The dual optocouplers 126 may be used by the USB PD IC 130 to signal to the PFC converter 136 the amount of voltage (e.g., indicated in the power profile 140) of the computing device 134. In some cases, a two-bit, binary signaling mechanism may be used by the dual optocouplers 126, as illustrated in Table 2. In the logic column of Table 2, 00 means both optocouplers are off, 01 means optocoupler 1 is off and optocoupler 2 is on, 10 means optocoupler 1 is on and optocoupler 2 is off, and 11 means optocoupler 1 is on and optocoupler 2 is on. Of course, other techniques may be used way to signal a requested voltage to the PFC controller 118. For example, another signaling technique may use four different brightness levels of a single optocoupler, e.g., off, dim, brighter, and brightest to signal 5V, 9V, 12V (or 15V), and 20V, respectively.

TABLE 2

| Optocouplers 1 and 2 | PFC output voltage | Voltage |
| --- | --- | --- |
| 00 | Vo1 | 5 V |
| 01 | Vo2 | 9 V |
| 10 | Vo3 | 15 V |
| 11 | Vo4 | 20 V |

The PFC converter 136 may, based on reading the dual optocouplers 126, change the output voltage Vo 112 to change a power 142 that is output by the LLC converter 138. In this way, the power supply 102 is able to retain the efficiency of an LLC resonant power supply while providing one of multiple voltage outputs without using inefficient DC-to-DC converters.

The A/C power 104, after being filtered (e.g., by EMI module 106) and rectified (by input rectifier 108) are input to the PFC converter 136 (e.g., comprising the PFC module 110 and the PFC controller 118). The output Vo 112 of the PFC converter 136 is input to the LLC converter 138 (comprising the LLC controller 114 and the LLC module 120). The output voltage Vo 112 of the PFC converter 136 is electrically connected to the LLC converter 138, and the voltage switching 124 is electrically connected to the LLC converter 138. Depending on the amount of power used by the computing device 134, the power supply 102 may receive the power profile 140 (e.g., one of multiple USB-C power profiles). When the power supply 102 is connected to a second computing device, the second computing device may request a second power profile (e.g., that is different from the power profile 140) and the PFC converter 136 may provide a different Vo 112 that causes the LLC converter 138 to provide a second power level (e.g., different from the power level 142). Thus, the LLC topology (e.g., the LLC converter 138) may be used to provide a voltage that scales according to (e.g., is proportional to) the output voltage Vo 112 of the PFC converter 136 to provide one of multiple output voltages to comply with the USB-C power delivery specification.

The power supply 102 may include (i) a first cable that terminates in an A/C plug that can be plugged into an electrical outlet to provide the A/C power 104 and (ii) a second cable that terminates in a USB-C plug that can be plugged into the USB-C port 132 of the computing device 134. The USB-C port 132 may detect when the USB-C plug of the power supply 102 is plugged into the USB-C port 132. In response, the USB PD IC 130 may use the dual optocouplers 126 to indicate the amount of power (e.g., 5V, 9V, 12/15V, or 20V) requested by the computing device 134, as shown in Table 2. For example, the dual optocouplers 126 may display 00 to request 5V, 01 to request 9V, 10 to request 12V (or 15V), and 11 to request 20V. The PFC converter 136 may determine the voltage to be provided to the computing device 134 by reading the dual optocouplers 126. Based on the reading, the PFC controller 118 may adjust the switching frequency of the LLC converter 138 by instructing the PFC module 110 to output an amount of Vo 112 that causes the LLC converter 138 to output the amount of power 142 requested by the USB PD IC 130. In this way, the power supply 102 can provide one of multiple voltages (e.g., one of the multiple power profiles of Table 1).

A resonant tank in an LLC topology typically includes a capacitor (Cr), a leakage Inductance (Lr), and a transformer magnetizing inductance (Lm). The resonant tank is connected in series with a load via the transformer (Lm). In such a configuration, the resonant tank and the load act as a voltage divider. By changing the frequency of voltage Vo 112, which is an input to the LLC converter 138, the impedance of the resonant tank changes. The impedance divides the input voltage with load. Because of the voltage divider, the DC gain of a series resonant converter (SRC) is less than 1. At resonant frequency, the impedance of the series resonant tank may be at its lowest point. Thus, at resonance, nearly the entire input voltage may drop on the load. Thus, for a series resonant converter, maximum gain may occur at the resonant frequency. The direct current (DC) characteristic of the LLC topology may be divided into a zero-voltage switch (ZVS) region and a zero-current switch (ZCS) region.

Input voltage range (PFC Vo_min to PFC Vo_max): The LLC resonant converter 138 (second stage) input voltage Vo 112 is provided by the PFC converter 136 (first stage). Thus, the input voltage to the LLC converter 138 is the nominal PFC output voltage (PFC Vo 112). An output gain of the LLC converter 138 scales according to the PFC Vo 112. Thus, peak gain in the LLC converter 138 remains relatively the same for all second stage output voltages. In this way, different output voltage (5V, 9V, 15V, 20V) of the LLC converter 138 may have corresponding different PFC output voltages Vo to support, as shown in Table 3.

TABLE 3

| Gmin | 0.95 | 0.95 | 0.95 | 0.95 |
| Vo. max | 34Vdc | 52Vdc | 102Vdc | 137Vdc |
| Gmax | 1.05 | 1.05 | 1.05 | 1.05 |
| Vo. min | 31Vdc | 57Vdc | 95Vdc | 127Vdc |
| Optocouplers | 00 | 01 | 10 | 11 |

The variable output voltage of the LLC converter 138 may have its own different peak gain. For example, the low output voltage may have low peak gain, while the high output voltage may have high peak gain. The PFC output voltage Vo 112 is adjusted to match a peak gain of the LLC converter 138, to prevent the output voltage of LLC converter 138 from going out of its voltage regulation. This is done by adjusting the PFC output voltage Vo 112 to different voltages that map to different output voltage of the LLC converter 138, thereby enabling the LLC converter 138 to remain in a same gain curve.

Thus, the efficiency of a resonant LLC converter is retained while using the PFC to vary the input voltage to the LLC converter to produce one of multiple voltages corresponding to the USB-C power profiles. The LLC converter is capable of achieving zero voltage switching (ZVS) to get very low (near zero) power loss from a metal oxide semiconductor field effect transistor (MOSFET) package while using fewer components and a smaller transformer.

Figure 2:
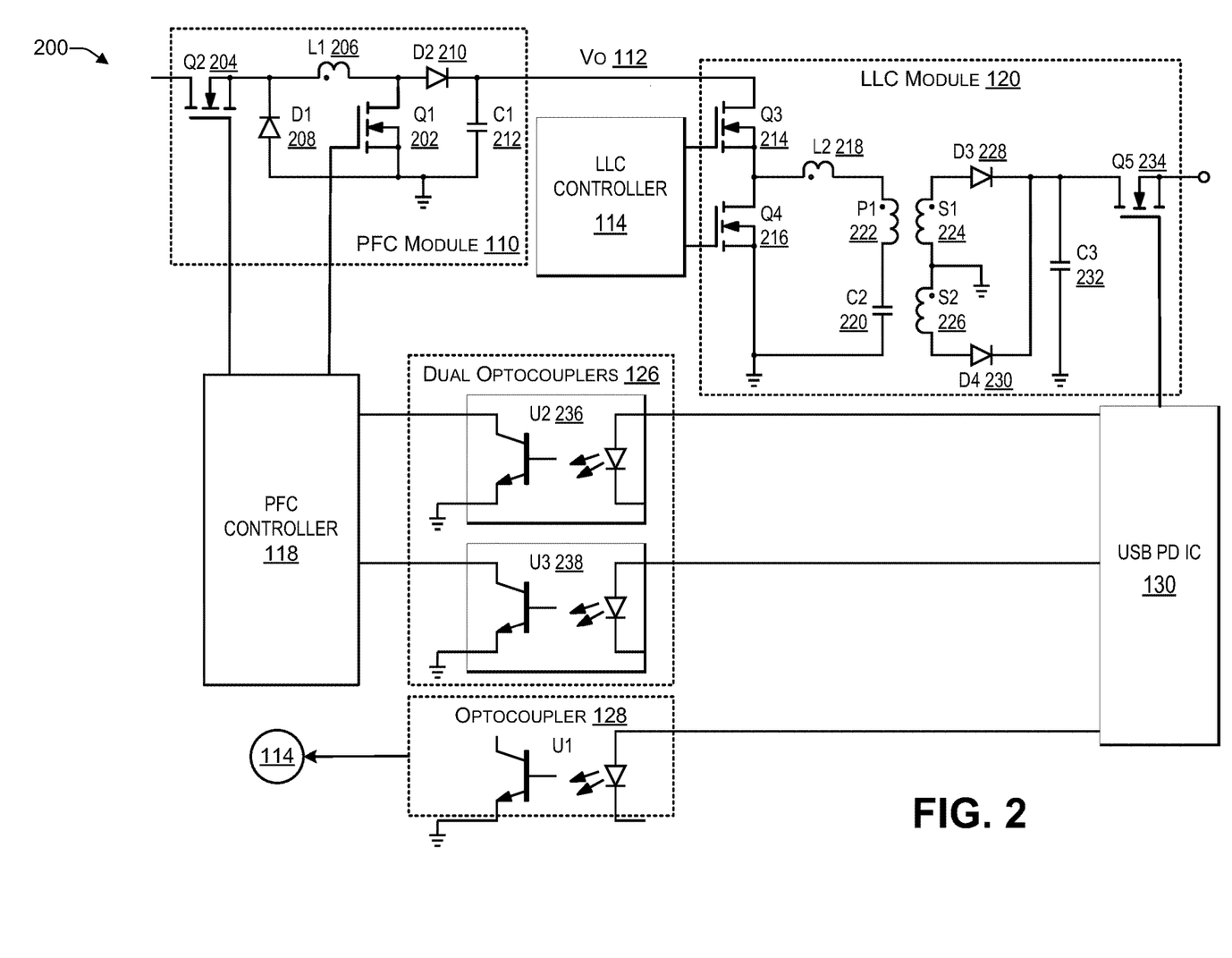
FIG. 2 is a schematic diagram of a portion of a power supply capable of negotiating power delivery with a universal serial bus (USB) power delivery (PD) integrated circuit (IC), according to some embodiments.

FIG. 2 is a schematic diagram 200 of a portion of a power supply (e.g., the power supply 102 of FIG. 1) capable of negotiating power delivery with a USB PD IC, according to some embodiments. The schematic diagram 200 includes the PFC module 110, the LLC controller 114, the PFC controller 118, the LLC module 120, and the dual optocouplers 126 of the power supply (e.g., the power supply 102 of FIG. 1) connected to the USB PD IC 130 of the computing device 134.

The PFC module 110 may include a transistor Q1 202, a transistor Q 204, an inductor L1 206, a diode D1 208, a diode D2 210, and a capacitor C1 212. The PFC module 110 may be controlled by the PFC controller 118.

The LLC module 102 may include a transistor Q3 214, a transistor Q4 216, an inductor L2 218, a capacitor C 220, a primary coil P1 222, a secondary coil S1 224, a second coil S2 226, a diode D3 228, a diode D4 230, a capacitor C2 232, and a transistor Q5 234. The LLC module 120 may be controlled by the LLC controller 114.

The dual optocouplers 126 may include an optocoupler U2 236 and an optocoupler U3 238. The optocoupler 128 may include an optocoupler U1.

The Vo 112 output voltage of the PFC module 110 is varied by changing the duty cycle at which Q1 202 and Q2 204 are switched. The PFC module 110 is a buck-boost converter and uses pulse width modulation (PWM), e.g., changing the duty cycle of Q1 202 and Q2 204, to adjust Vo 112.

Thus, in contrast to a conventional resonant LLC topology in which Vo of a PFC module is a fixed voltage, the voltage output Vo 112 of the PFC module 110 may be varied by the PFC controller 118. The voltage Vo 112 is provided as an input to the LLC converter (e.g., the LLC controller 114 and the LLC module 120). The LLC controller 114 and the LLC module 120 may be configured to provide a single fixed output voltage that scales in voltage level proportional to the voltage Vo 112. For example, a first voltage level of Vo 112 may cause the LLV module 120 to output 5V to the USB-C port 132 of the computing device 134, a second voltage level of Vo 112 may cause the LLV module 120 to output 9V to the USB-C port 132 of the computing device 134, a third voltage level of Vo 112 may cause the LLV module 120 to output 15V (or 12V) to the USB-C port 132 of the computing device 134, and a fourth voltage level of Vo 112 may cause the LLV module 120 to output 20V to the USB-C port 132 of the computing device 134.

After the power supply 102 of FIG. 1 is plugged into the USB-C port 132, the USB PD IC 130 may use the dual optocouplers 126 to request a particular amount of power (e.g., 5V, 9V, 12/15V, or 20V) (e.g., as per Table 2). For example, the SB PD IC 130 may cause the optocouplers 236, 238 to display 00 to request 5V, 01 to request 9V, 10 to request 12V (or 15V), and 11 to request 20V. The PFC controller 118 may determine the voltage to be provided to the computing device 134 based on reading the dual optocouplers 126. Based on the reading, the PFC controller 118 may instruct the PFC module 110 to output a Vo that causes the LLC module 120 (e.g., via Q5 234) to output the amount of power requested by the USB PD IC 130. In this way, the dual optocouplers 126 can be used to specify one of four different voltages (e.g., one of the four power profiles of Table 1). In this way, the efficiency of an LLC resonant power supply is retained by not using DC-to-DC converters (e.g., DC-to-DC converters increase power loss and reduce efficiency). Unlike a conventional LLC resonant power supply that uses a fixed voltage and can thus only provide a single output voltage, the systems and techniques described herein enable a power supply to configure itself to deliver one of multiple voltages.

Figure 3:
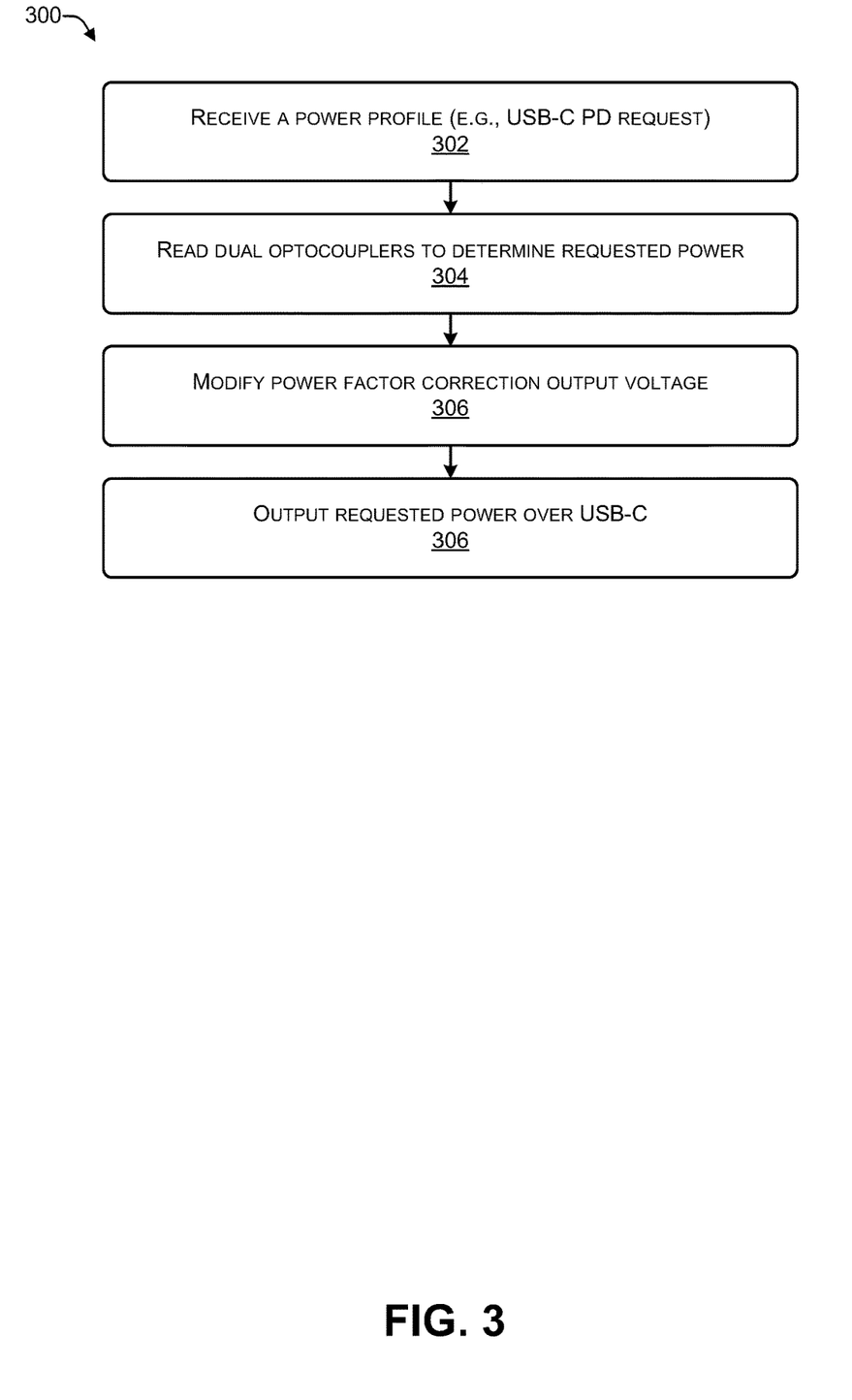
FIG. 3 is a flowchart of a process that includes negotiating power delivery to a computing device, according to some embodiments.

In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2 as described above, although other models, frameworks, systems and environments may be used to implement these processes.

FIG. 3 is a flowchart of a process that includes negotiating power delivery to a computing device, according to some embodiments. The process may be performed by the power supply 102 of FIG. 1 or the schematic diagram illustrated in FIG. 2.

At 302, the process may receive a power profile (e.g., a USB-C PD request). At 304, the process may read dual optocouplers to determine a requested amount of power. At 306, the process may modify an output voltage of a PFC converter. At 308, the process may output the requested power over USB-C. For example, in FIG. 1, after the power supply 102 is plugged into the USB-C port 132, the USB PD IC 130 may provide a power profile during USB-C power delivery negotiations and illuminate the dual optocouplers 126 to request a particular amount of voltage (e.g., one of 5V, 9V, 12/15V, or 20V) (e.g., as per Table 2). For example, the USB PD IC 130 may cause the optocouplers 236, 238 to display 00 to request 5V, 01 to request 9V, 10 to request 12V (or 15V), and 11 to request 20V. The PFC controller 118 may determine the voltage to be provided to the computing device 134 based on reading the dual optocouplers 126. Based on the reading, the PFC controller 118 may instruct the PFC module 110 to output a Vo that causes the LLC module 120 to output the amount of power requested by the USB PD IC 130. In this way, the USB PD IC 130 may use the dual optocouplers 126 to specify one of four different voltages (e.g., one of the four power profiles of Table 1). In this way, the efficiency of an LLC resonant power supply is retained by not using DC-to-DC converters (e.g., DC-to-DC converters increase power loss and reduce efficiency). Unlike a conventional LLC resonant power supply that uses a fixed voltage and can thus only provide a single output voltage, the systems and techniques described herein enable a power supply to configure itself (e.g., by changing a switching frequency) to deliver one of multiple voltages.

Figure 4:
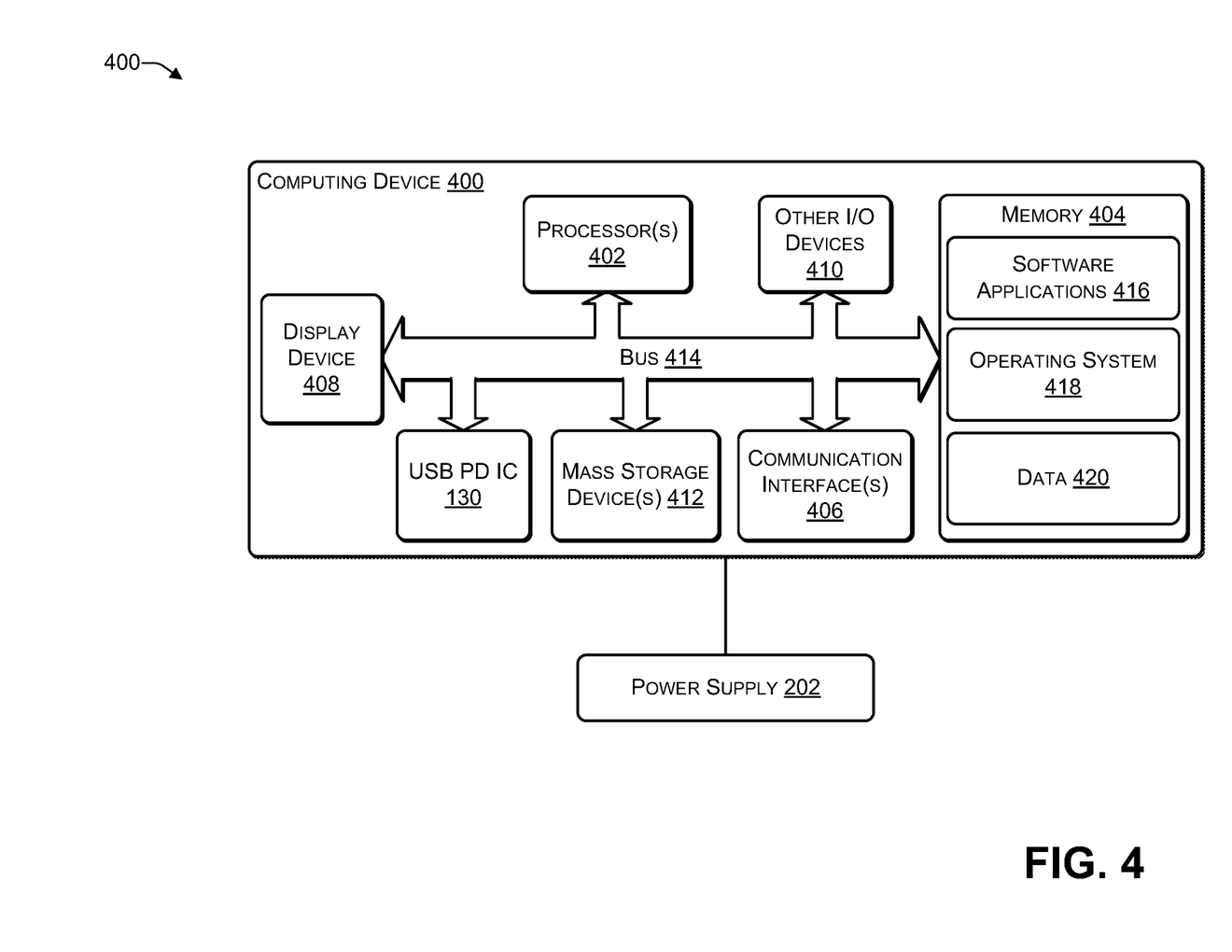
FIG. 4 illustrates an example configuration of a computing device that can be used to implement the systems and techniques described herein.

FIG. 4 illustrates an example configuration of a computing device 400 that can be used to implement the systems and techniques described herein, such as for example, the computing device 134 of FIG. 1.

The computing device 400 may include one or more processors 402 (e.g., including a central processing unit (CPU), a graphics processing unit (GPU), or the like), a memory 404, communication interfaces 406, a display device 408, other input/output (I/O) devices 410 (e.g., a keyboard, a trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated with a CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via a network. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store software applications 416, an operating system 418, and data 420.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A power supply comprising:
a first stage comprising:
a power factor correction controller; and
a power factor correction module;
a second stage comprising:
an inductor-inductor-capacitor controller; and
an inductor-inductor-capacitor module;
a single optocoupler in a feedback loop between the first and second stages; and
dual optocouplers including first and second optocouplers;
wherein the first stage is configured to:
receive, from a computing device that is connected to the power supply, a power profile associated with the computing device; and
output a first particular voltage based at least in part on the power profile;
wherein the second stage is configured to:
receive the first particular voltage from the first stage; and
output, based on the first particular voltage, a second particular voltage to the computing device, wherein the second particular voltage is specified by the power profile; and
wherein the dual optocouplers are configured to:
indicate an amount of voltage to be provided by the power supply to the computing device based on a selected power state combination of a plurality of power state combinations of the first and second optocouplers.

2. The power supply of claim 1, wherein:
a universal serial bus type-C (USB-C) cable connects the power supply to the computing device; and
a jack of the USB-C cable is plugged into a USB-C port of the computing device.

3. The power supply of claim 2, wherein:
the power profile is sent by a USB-C power delivery (PD) integrated circuit (IC) that is built-in to a USB-C port of the computing device in response to the USB-C PD IC determining that the USB-C cable is plugged into the USB-C port of the computing device.

4. The power supply of claim 1, wherein:
when the first optocoupler is off and the second optocoupler is off the second particular voltage comprises 5 volts.

5. The power supply of claim 4, further comprising:
when the first optocoupler is off and the second optocoupler is on the second particular voltage comprises 9 volts.

6. The power supply of claim 4, further comprising:
when the first optocoupler is on and the second optocoupler is off the second particular voltage comprises 15 volts.

7. The power supply of claim 4, further comprising:
when the first optocoupler is on and the second optocoupler is on the second particular voltage comprises 20 volts.

8. A power supply comprising:
a power factor correction converter comprising:
a power factor correction controller; and
a power factor correction module;
an inductor-inductor-capacitor (LLC) converter comprising:
an LLC controller; and
an LLC module;
a single optocoupler in a feedback loop between the power factor correction converter and the LLC converter; and
dual optocouplers including first second optocouplers;
wherein the power factor correction converter is configured to:

receive, from a computing device that is connected to the power supply, a power profile associated with the computing device; and output a first particular voltage based at least in part on the power profile; and wherein the LLC converter is configured to:

receive the first particular voltage from the power factor correction converter; and output, based on the first particular voltage, a second particular voltage to the computing device, wherein the second particular voltage is specified by the power profile; and wherein the dual optocouplers are configured to:

indicate an amount of voltage to be provided by the power supply to the computing device based on a selected power state combination of a plurality of power state combinations of the first and second optocouplers.

9. The power supply of claim 8, wherein:

the power profile is sent by a USB-C power delivery (PD) integrated circuit (IC) that is built-in to a USB-C port of the computing device.

10. The power supply of claim 8, wherein:

when the first optocoupler is off and the second optocoupler is off the second particular voltage comprises 5 volts.

11. The power supply of claim 10, further comprising:

when the first optocoupler is off and the second optocoupler is on the second particular voltage comprises 9 volts.

12. The power supply of claim 10, further comprising:

when the first optocoupler is on and the second optocoupler is off the second particular voltage comprises 15 volts.

13. The power supply of claim 10, further comprising:

when the first optocoupler is on and the second optocoupler is on the second particular voltage comprises 20 volts.

14. A power supply comprising:

a power factor correction converter comprising:
  a power factor correction controller; and
  a power factor correction module;

an inductor-inductor-capacitor (LLC) converter comprising:
  an LLC controller; and
  an LLC module;

a single optocoupler in a feedback loop between the power factor correction converter and the LLC converter; and dual optocouplers including first second optocouplers;

wherein the power factor correction converter is configured to:

receive, from a computing device that is connected to the power supply, a power profile associated with the computing device; and output a first particular voltage based at least in part on the power profile; and wherein the LLC converter is configured to:

receive the first particular voltage from the power factor correction converter; and output, based on the first particular voltage, a second particular voltage to the computing device, wherein the second particular voltage is specified by the power profile;

wherein a filter is used to remove ripple and noise from the second particular voltage to create filtered voltage; and wherein the dual optocouplers are configured to:

indicate an amount of voltage to be provided by the power supply to the computing device based on a selected power state combination of a plurality of power state combinations of the first and second optocouplers.

15. The power supply of claim 14, wherein:

the power profile is sent by a USB-C power delivery (PD) integrated circuit (IC) that is built-in to a USB-C port of the computing device.

16. The power supply of claim 14, wherein:

the power factor correction converter determines the first particular voltage based at least in part on the dual optocouplers.

17. The power supply of claim 14, wherein:

when the first optocoupler is off and the second optocoupler is off the second particular voltage comprises 5 volts;

when the first optocoupler is off and the second optocoupler is on the second particular voltage comprises 9 volts;

when the first optocoupler is on and the second optocoupler is off the second particular voltage comprises 15 volts;

when the first optocoupler is on and the second optocoupler is on the second particular voltage comprises 20 volts.

\* \* \* \* \*